June 15, 1971  A. FRANKS ET AL  3,585,121
DIFFRACTION GRATINGS
Filed Nov. 14, 1968

United States Patent Office 3,585,121
Patented June 15, 1971

3,585,121
DIFFRACTION GRATINGS
Albert Franks, London, and Kevin Lindsey, Surbiton, Surrey, England, assignors to National Research Development Corporation, London, England
Filed Nov. 14, 1968, Ser. No. 775,866
Claims priority, application Great Britain, Nov. 17, 1967, 52,515/67; Mar. 8, 1968, 11,433/68
Int. Cl. C23c 15/00
U.S. Cl. 204—192                                    8 Claims

ABSTRACT OF THE DISCLOSURE

A method of making diffraction gratings, particularly X-ray diffraction gratings, in which those parts of the grating that form the bottoms of diffracting grooves below the general optically smooth surface of the grating are subjected to an electrical etching process.

---

This invention relates to diffraction gratings, and particularly but not exclusively to such gratings for use with X-rays.

It has been proposed to make X-ray diffraction gratings by depositing a layer of metal upon an optically polished surface of a glass body, ruling the metal surface, partially dissolving the metal to expose the glass surface beneath the rulings, etching the glass with hydrofluoric acid to produce substantially flat-bottomed grooves below the original surface of the glass, and finally etching away the remaining metal.

The glass body may itself be utilised to provide the required grating; alternatively it may be used as a "master" from which further gratings may be produced by known replication techniques.

However, with this method the grooves formed in the glass body do not have bottoms that are generally sufficiently smooth for the gratings to be used as efficient phase gratings, i.e. a form of grating in which X-rays reflected respectively from the bottoms of the grooves and the tops of the ridges between them are made to interfere destructively for the zero order, or totally reflected beam, and constructively for the first-order, diffracted beam.

A similar problem arises in the case of optical diffraction gratings, which although not used in the mode of a phase grafting do suffer from spurious effectst due to the scattering of light from the rough grooves produced by the tools with which such gratings are normally ruled.

According to the present invention there is provided a method of manufacturing a diffraction grating including the steps of producing a composite structure comprising a body having an optically worked surface and a series of regularly spaced adherent strips formed on said surface so as to alternate with exposed strips of said surface etching the exposed strips to produce a series of grooves of substantially uniformed depth extending into the body below the original level of said surface, and utilising the resultant structure to produce a monolithic body having a surface pattern alternating regularly between two levels which respectively corresponding to said surface and the bottoms of said grooves, characterized in that at least that part of said surface pattern which corresponds to the bottoms of said grooves is subjected to an electrical etching treatment.

According to the present invention in a first aspect there is provided a method of manufacturing a diffraction grating including the steps of producing upon an optically worked surface of a body a series of regularly spaced adherent strips alternating with exposed strips of the optically worked surface, chemically etching the exposed surface to produce a series of substantially flat-bottomed grooves below the original level of the optically worked surface applying to said grooves an electrical smoothing etch, and removing the said adherent strips.

According to the present invention in a second aspect there is provided a method of manufacturing a diffraction grating including the steps of producing upon an optically worked surface of a body a series of regularly spaced adherent strips alternating with exposed strips of the optically worked surface, chemically etching the exposed surface to produce a series of substantially flat-bottomed grooves below the original level of the optically worked surface, removing the said adherent strips, making a replica of the surface of the grating after the adherent strips have been removed, and applying an electrical smoothing etch to the surface of the replica.

The first and second aspects of the invention are particularly suited to the production of diffraction gratings having grooves the depths of which are in the region of 1000 A.

A third aspect of the invention however is more suited to the production of diffraction gratings having grooves which are considerably shallower than 1000 A. This third aspect of the invention has the advantage that only one form of etching of the body is used. The third aspect of the invention provides a method of manufacturing a diffraction grating including the operation of producing upon an optically worked surface of a body a series of regularly spaced adherent strips alternating with exposed strips of the optically worked surface, electrically etching the exposed surface to produce a series of substantially flat-bottomed grooves below the original level of the optical surface, the adherent strips being such that they are not completely removed during the etching process, and removing the adherent strips.

The electrical smoothing etch may take the form of ion etching by direct current or radio-frequency sputtering techniques.

Methods in accordance with the invention, suitable for the production of phase-type X-ray diffraction gratings having a pitch finer than 10 microns will now be described by way of example with reference to the accompanying diagrammatic drawings, in which.

Figure 1:
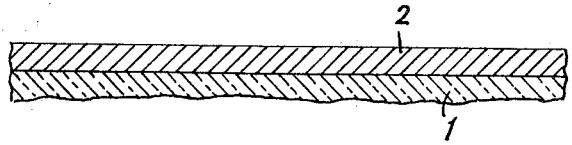
FIGS. 1 to 5 illustrate successive stages in a method embodying the first aspect of the invention.
Figure 2:
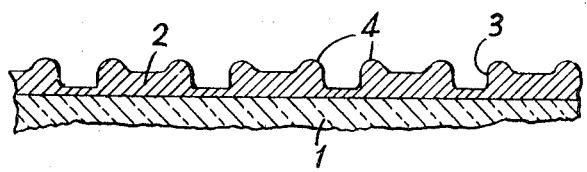
Figure 3:
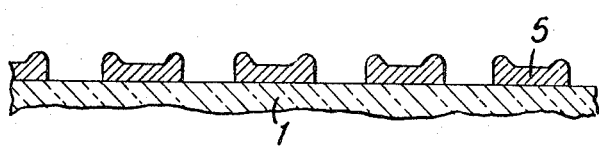
Figure 4:
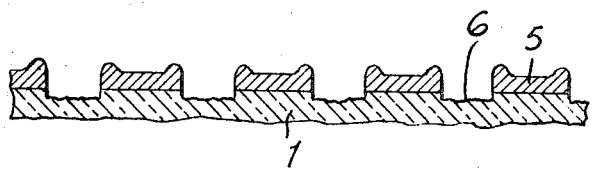
Figure 5:
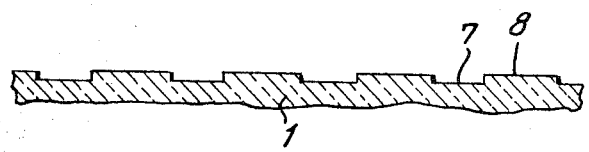

Referring to FIG. 1, an optically worked surface of a glass member 1 has deposited upon it by a suitable technique such as evaporation ion bombardment a layer 2 of a metal that is insoluble in the hydrofluoric acid, for example gold. A series of grooves is ruled in the layer 2 in a known fashion, but with a smooth tool instead of the conventional pointed tool. As shown in FIG. 2, the result is to produce grooves 3 that are flanked by narrow burrs 4 having a smooth contour. The layer 2 is then ion etched until the optically worked surface is exposed as shown in FIG. 3, leaving a series of adherent metal strips 5 alternating with exposed strips of the optically worked surface. This surface is then etched with hydrofluoric acid to produce, as shown in FIG. 4 a series of substantially flat-bottomed grooves 6 depressed below the original optically worked surface. The grooves 6 may typically have a depth in the region of 1000 A., their bottoms having some irregularities as indicated in exaggerated form in FIG. 4. These irregularities are removed by subjecting the grooves 6 to an electrical smoothing etch, and the metal strips 5 are then removed by known techniques to expose the unetched parts of the original optically worked surface. The resultant structure shown in FIG. 5 constitutes the final grating, in which smooth flat-bottomed grooves 7 alternate with ridges 8 whose surfaces correspond to the original optically worked surface.

Figure 6:
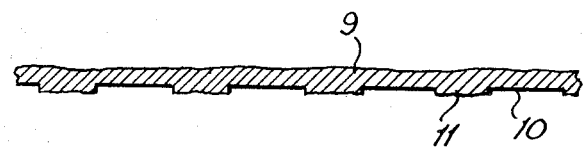
FIGS. 6 and 7 illustrate the final stages in a method embodying the second aspect of the invention.
Figure 7:
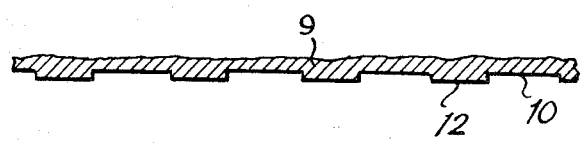

Turning now to the method embodying the second aspect of the invention, the initial stages are the same as described above, up to the point at which the structure shown in FIG. 4 is produced, but in this case the metal strips 5 are removed without any smoothing etch having been applied to the grooves 6. The resultant glass surface is replicated in known fashion to form, as shown in FIG. 6, a gold replica 9 having flat-bottomed grooves 10, whose surfaces correspond to parts of the original optically worked surface, alternating with ridges 11 whose surfaces correspond to the bottoms of the grooves 6. The entire surface of the replica 9 is then subjected to an electrical smoothing etch to produce the final grating shown in FIG. 7, in which the grooves 10 alternate with smooth flat-topped ridges 12.

Figure 8:
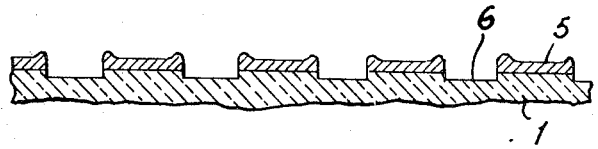
FIGS. 8 and 9 illustrate successive steps in a method embodying the third aspect of the invention.
Figure 9:
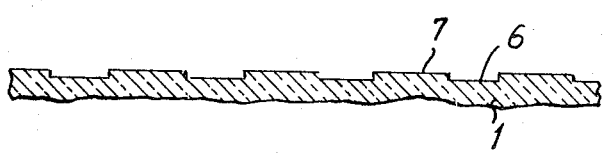

Referring to FIGS. 8 and 9, in which elements the same as those already described have the same reference numerals, an optically worked surface of a glass substrate 1 has deposited upon it a layer 2 of a metal such as gold. Again a series of grooves is ruled in the layer 2 in a known fashion, but with a smooth tool instead of the conventional pointed tool. As shown in FIG. 2, the result is to produce grooves 3 that are flanked by narrow burrs 4 having a smooth contour. Again the layer 2 is then ion etched until the optically worked surface is exposed as shown in FIG. 3, leaving a series of adherent metal strips 5 alternating with exposed strips of the optically worked surface. However, etching is then continued to produce (as shown in FIG. 8) flat-bottomed grooves 6 extending to a depth of approximately 100 A. below the optically worked surface, the surfaces of the grooves 6 being very smooth by virtue of the nature of the etching process. During the formation of the grooves 6 parts of the strips 5 will be removed but the original layer 2 is made of such a thickness that the strips 5 are not entirely removed during the etching process. The remainder of strips 5 is removed by known techniques when the etching has been completed, so as to expose the unetched part of the original optically worked surface. The resultant structure is shown in FIG. 9 and constitutes the final grating, in which smooth flat-bottomed grooves 6 alternate with ridges 7 whose surfaces correspond to the original optically worked surface of the substrate 1.

A problem that can arise is that irregularities in the thickness of the metal layer 2 can cause the etching of the surface of the substrate 1 to start at scattered points instead of uniformly, thus giving rise to unevenness of the depths of the grooves 6. This can be overcome by using for the layer 2 a metal that can be chemically etched by an etch that does not effect glass, and chemically etching the layer 2 until the surface of the substrate 1 is completely exposed where the grooves 6 are to be formed, before the electrical etching is begun. A suitable metal is, for example, aluminium which can be etched by means of a caustic solution incorporating a detergent.

The ion etching can be carried out using either DC or radio-frequency techniques, the former being possible in spite of the dielectric nature of the substrate 1 because the strips 5 conduct away the electric charge collected by the substrate 1.

We claim:

1. A method of manufacturing a diffraction grating including the steps of producing a composite structure comprising a body having an optically worked surface and a series of regularly spaced adherent strips formed on said surface so as to alternate with exposed strips of said surface, etching the exposed strips to produce a series of grooves of substantially uniform depth extending into the body below the original level of said surface, and utilising the resultant structure to produce a monolithic body having a surface pattern alternating regularly between two levels which respectively correspond to said surface and the bottom of said grooves, characterised in that at least that part of said surface pattern which corresponds to the bottom of said grooves is subjected to an electrical ion etching treatment.

2. A method according to claim 1, wherein the electrical ion etching is by direct current techniques.

3. A method according to claim 1, wherein the electrical ion etching is by radio frequency techniques.

4. A diffraction grating when produced by the method according to claim 1.

5. A method of manufacturing a diffraction grating including steps of producing a composite structure comprising a body having an optically worked surface and a series of regularly spaced adherent strips formed on said surface so as to alternate with exposed strips of said surface, chemically etching the exposed strips to produce a series of grooves of substantially uniform depth extending into the body below the original level of said surface, applying to said grooves an electrical ion smoothing etch, and removing the said adherent strips.

6. A method of manufacturing a diffraction grating including the steps of producing a composite structure comprising a body having an optically worked surface and a series of regularly spaced adherent strips formed on said surface so as to alternate with exposed strips of said surface, chemically etching the exposed strips to produce a series of grooves of substantially uniform depth extending into the body below the original level of said surface, chemically etching the exposed surface to produce a series of substantially flat-bottomed grooves below the original level of the optically worked surface, removing the said adherent strips, making a replica of the surface of the grating after the adherent strips have been removed and applying an electrical ion smoothing etch to the surface of the replica.

7. A method of manufacturing a diffraction grating including the steps of producing a composite structure comprising a body having an optically worked surface and a series of regularly spaced adherent strips formed on said surface, so as to alternate with exposed strips of said surface, electrically ion etching the exposed strips of the said surface to produce a series of substantially flat-bottomed grooves below the original level of the said surface, the adherent strips being such that they are not completely removed during the etching process, and removing the adherent strips.

8. A method according to claim 7 wherein the series of regularly spaced adherent strips formed on said surface are produced by chemically etching a layer adhering to the optically worked surface before the electrical ion etching is begun.

References Cited

UNITED STATES PATENTS

| | | | |
|---|---|---|---|
| 3,210,263 | 10/1965 | Jones | 204—192X |
| 3,388,735 | 6/1968 | Sayce | 164—47 |
| 3,423,303 | 1/1969 | Davidse et al. | 204—192 |

JOHN H. MACK, Primary Examiner

N. A. KAPLAN, Assistant Examiner

U.S. Cl. X.R.

204—298; 264—1; 350—162